United States Patent
Kishi

(10) Patent No.: US 7,227,911 B2
(45) Date of Patent: Jun. 5, 2007

(54) MULTICHANNEL RECEIVER FOR SIMULTANEOUSLY RECEIVING A PLURALITY OF DIFFERENT CHANNEL SIGNALS

(75) Inventor: Takahiko Kishi, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 829 days.

(21) Appl. No.: 10/434,054

(22) Filed: May 8, 2003

(65) Prior Publication Data

US 2003/0219077 A1    Nov. 27, 2003

(30) Foreign Application Priority Data

May 8, 2002    (JP)    ............... 2002-133221

(51) Int. Cl.
H03K 9/00 (2006.01)
H04L 27/00 (2006.01)
H03D 3/00 (2006.01)

(52) U.S. Cl. ................. 375/316; 327/102
(58) Field of Classification Search ......... 375/260, 375/316, 335; 327/102, 113; 329/327; 708/313; 348/607, 659; 341/157; 455/313–319, 323, 455/326, 332, 333
See application file for complete search history.

(56) References Cited

U.S. PATENT DOCUMENTS 5,789,963 A * 8/1998 Sakusabe ............. 327/356
6,282,413 B1 * 8/2001 Baltus .................. 455/260
2003/0099315 A1 * 5/2003 Beaudin ............... 375/347
2003/0219077 A1 * 11/2003 Kishi ................... 375/260

* cited by examiner

Primary Examiner—David C. Payne
Assistant Examiner—Aslan Ettehadieh
(74) Attorney, Agent, or Firm—The Farrrell Law Firm

(57) ABSTRACT

A multichannel receiver for effectively receiving multichannel signals at the same time without any restrictions in the symbol timing and channel interval of modulated signals. A quadrature detector of the multichannel receiver includes first and second multipliers. The first multiplier multiplies a received signal by a real number axis signal generated from a quadrature carrier oscillator. The second multiplier multiplies a received signal by an imaginary number axis signal. The quadrature detector converts a carrier of a center signal of odd signals into a DC component of zero frequency, and converts the center signal into a complex baseband signal, and at the same time converts carrier signals other than the center carrier signal into a complex IF signal symmetrical to the DC component of zero frequency. ADCs (Analog-to-Digital Converters) convert the complex IF signals into complex IF digital signals. The complex IF digital signals are applied to a first group of complex mixers and a second group of complex mixers at the same time. The complex mixers correspond to individual channels, and their local signal frequencies have a complex conjugate relation to each other. The complex mixers perform frequency conversion on their reception signals, and thus generate complex baseband signals.

24 Claims, 9 Drawing Sheets

MULTICHANNEL RECEIVER FOR SIMULTANEOUSLY RECEIVING A PLURALITY OF DIFFERENT CHANNEL SIGNALS

This application claims priority to an application entitled "MULTICHANNEL RECEIVER", filed in the Japanese Patent Office on May 8, 2002 and assigned Ser. No. 2002-133221, the contents of which are hereby incorporated by reference.

BACKGROUND OF THE INVENTION

1. Field of the Invention

The present invention relates to a multichannel receiver for receiving a plurality of different channel signals at the same time.

2. Description of the Related Art

Typically, there has been wide use of a FFT (Fast Fourier Transform) for simplifying a process for receiving a plurality of channel signals having different carrier frequencies at the same time. Provided that a plurality of channel signals having different carrier frequencies are simultaneously received using the FFT, a Nyquist bandwidth is divided by N/2 when a reception signal is a real digital signal, or divided by N when a reception signal is a complex digital signal, such that N signals having different carrier frequencies are divided for every carrier (i.e., is set to different channels for every carrier) and at the same time each signal can be converted into a baseband signal.

The term "channel" means a frequency domain on a frequency axis for indicating either a reception signal in the communication field and a transmission/reception signal in the broadcasting field, or a carrier frequency of these signal waves.

For example, FIG. 9 is a block diagram illustrating a conventional receiver. Referring to FIG. 9, a quadrature detector 2 includes a first multiplier 22 for multiplying a signal received from an antenna 1 by a real number axis signal "cos" of a local signal generated from a quadrature carrier oscillator 21, and a second multiplier 23 for multiplying the signal received from the antenna 1 by an imaginary number axis signal "−sin" having a phase that is 90 degrees ahead of that of the real number axis signal "cos", and therefore, converts a plurality of channel signals into complex IF (Intermediate Frequency) signals. Analog-to-digital converters (ADCs) 3a and 3b performs A/D conversion on the complex IF signals of the quadrature detector 2, such that the complex IF signals are converted into complex IF digital signals. FFT 51 receives the complex IF digital signals having different carrier frequencies from the ADCs 3a and 3b, simultaneously converts them into baseband signals, and then outputs the baseband signals to a parallel/serial converter 52.

However, when of receiving a plurality of channel signals having different carrier frequencies using the aforementioned FFT, it is necessary for symbol timings of modulated waves of individual channel signals to be synchronized with each other. Moreover, in order to separate each channel signal from the plurality of channel signals received at the same time, a frequency denoted by an inverse number of the symbol timing (i.e., a symbol synchronization) of the modulated wave should be set to a carrier interval frequency of each channel. In order to meet the above requirements, a prescribed relationship between an OFDM symbol and each modulated signal should be engaged in advance. However, provided that the modulated signals are different in carrier frequency, it is difficult for even an OFDM scheme to meet the above requirements, and moreover there is no way to solve this problem in actual practice.

Therefore, it is desirable that a plurality of receivers are arranged in parallel with one another to receive a plurality of different channel signals at the same time. The FFT scheme is especially suitable to the case where more than several tens of carrier signals are received at the same time, but it is hard to say that the FFT scheme is also suitable to the case where there is a small number of carriers. Moreover, there is no way for a conventional reception end to stably receive a small number of carrier signals at the same time.

SUMMARY OF THE INVENTION

Therefore, the present invention has been designed in view of the above problems, and it is an object of the present invention to provide a multichannel receiver for effectively receiving multichannel signals at the same time without any restrictions in the symbol timing and channel interval (also called "channel spacing") of modulated signals.

In accordance with one aspect of the present invention, the above and other objects can be accomplished by a multichannel receiver for simultaneously receiving an odd number of a plurality of signals having different channels, comprising: a complex output frequency converter for converting a carrier of a center signal of the odd number of the plurality of signals into a DC (Direct Current) component of zero frequency, converting the center signal into a complex baseband signal, and converting signals other than the center signal into a complex IF (Intermediate Frequency) signal symmetrical to the DC component of zero frequency; a plurality of ADCs (Analog-to-Digital Converters) for sampling a real number axis signal and an imaginary number axis signal of the complex output signals of the complex output frequency converter to create digital signals; at least one positive(+) frequency converter, corresponding to individual channels, for converting at least one positive(+) channel complex signal generated from the ADCs into baseband signals; and at least one negative(−) frequency converter, corresponding to the individual channels, for convening at least one negative(−) channel complex signal generated from the ADCs into baseband signals, wherein a complex local signal of the positive(+) frequency convener corresponding to a complex IF signal symmetrical to the DC component of zero frequency is a complex conjugate of a complex local signal of the negative(−) frequency.

The above multichannel receiver enables the complex output frequency converter to convert a carrier of a center signal among at least three odd signals into a DC component of zero frequency, such that it can directly extract a center signal among at least three odd signals having different channels from an output signal of a set of ADCs as a baseband signal being a digital signal. The multichannel receiver enables the set of ADCs to convert a complex IF signal symmetrical to a DC component of zero frequency into digital signals, and allows positive(+) frequency converters and negative(−) frequency converters corresponding to channels of individual signals to convert the resultant signal into baseband signals at the same time. In this case, the number of positive(+) frequency converters and the number of negative(−) frequency converters are respectively identical with the number of signals including local signals having a complex conjugate relation to each other.

In accordance with another aspect of the present invention, there is provided a multichannel receiver for simultaneously receiving an even number of a plurality of signals having different channels, comprising: a complex output frequency converter for converting a center frequency of a carrier frequency of the even number of the plurality of signals into a DC component of zero frequency, and converting the even number of the plurality of signals into a complex IF signal symmetrical to the DC component of zero frequency; a plurality of ADCs for sampling a real number axis signal and an imaginary number axis signal of the complex output signals of the complex output frequency converter to create digital signals; at least one positive(+) frequency converter, corresponding to individual channels, for converting at least one positive(+) channel complex signal generated from the ADCs into complex baseband signals; and at least one negative(−) frequency converter, corresponding to the individual channels, for converting at least one negative(−) channel complex signal generated from the ADCs into complex baseband signals, wherein a complex local signal of the positive(+) frequency converter corresponding to a complex IF signal symmetrical to the DC component of zero frequency is a complex conjugate of a complex local signal of the negative(−) frequency converter.

The above multichannel receiver enables the complex output frequency converter to convert the center frequency (i.e., intermediate frequency (IF)) of a carrier frequency of at least two even signals into a DC component of zero frequency, enables a set of ADCs to convert a complex IF signal symmetrical to the DC component of zero frequency into digital signals, and allows positive(+) frequency converters and negative(−) frequency converters corresponding to channels of individual signals to convert the resultant signal into baseband signals at the same time. In this case, the number of positive(+) frequency converters and the number of negative(−) frequency converters are respectively identical with the number of signals including local signals having a complex conjugate relation to each other.

In accordance with yet another aspect of the present invention, there is provided a multichannel receiver for simultaneously receiving an even number of a plurality of signals having different channels, comprising: a primary frequency converter for converting the even number of the plurality of signals into IF signals; an ADC for sampling an output signal of the primary frequency converter to generate a digital signal; a complex output digital frequency converter for converting a center frequency of a carrier frequency of the even number of the plurality of signals into a DC component of zero frequency, and converting the even number of the plurality of signals into a complex IF digital signal symmetrical to the DC component of zero frequency; at least one positive(+) frequency converter, corresponding to individual channels, for converting at least one positive(+) channel complex signal generated from the complex output digital frequency converter into complex baseband signals; and at least one negative(−) frequency converter, corresponding to the individual channels, for converting at least one negative(−) channel complex signal generated from the complex output digital frequency converter into complex baseband signals, wherein a complex local signal of the positive(+) frequency converter corresponding to a complex IF signal symmetrical to the DC component of zero frequency is a complex conjugate of a complex local signal of the negative(−) frequency converter.

The above multichannel receiver enables the primary frequency converter to convert at least two even signals having different channels into IF signals, and controls ADCs to convert the IF signals into digital signals, such that a complex output digital frequency converter converts a center frequency of a carrier frequency of at least two even signals into a DC component of zero frequency, and converts at least two even signals into complex IF digital signals symmetrical to a DC component of zero frequency.

In addition, the above multichannel allows positive(+) frequency converters and negative(−) frequency converters corresponding to channels of individual signals to convert the complex IF digital signals symmetrical to the DC component of zero frequency into baseband signals at the same time. In this case, the number of positive(+) frequency converters and the number of negative(−) frequency converters are respectively identical with the number of signals including local signals having a complex conjugate relation to each other.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
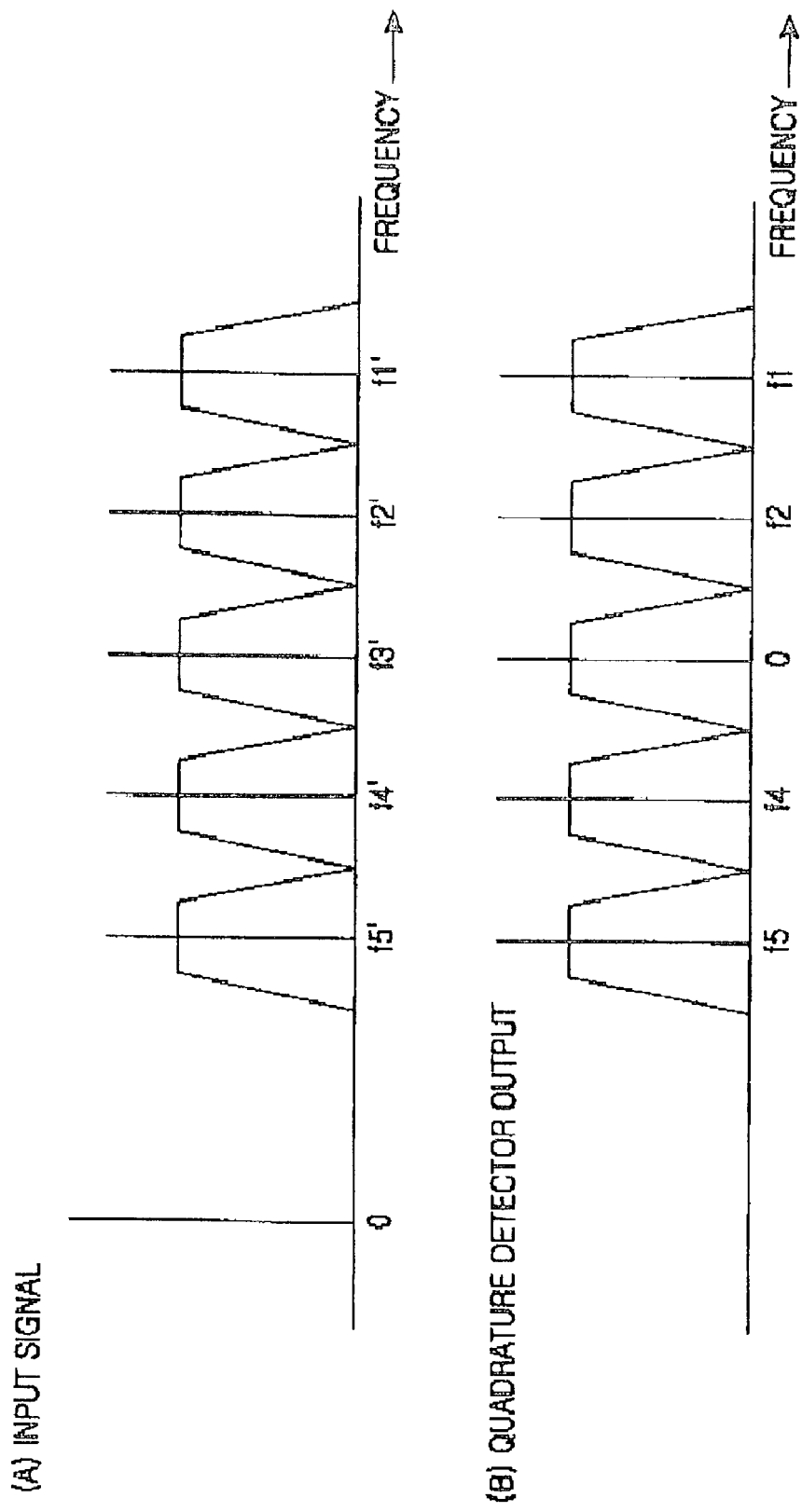
FIG. 1 is an exemplary view illustrating input signals of a multichannel receiver in accordance with a first preferred embodiment of the present invention.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

1. First Preferred Embodiment

A first preferred embodiment is illustrated with a multichannel receiver for simultaneously receiving five signals f1', f2', f3', f4', and f5', in FIG. 1a.

Figure 2:
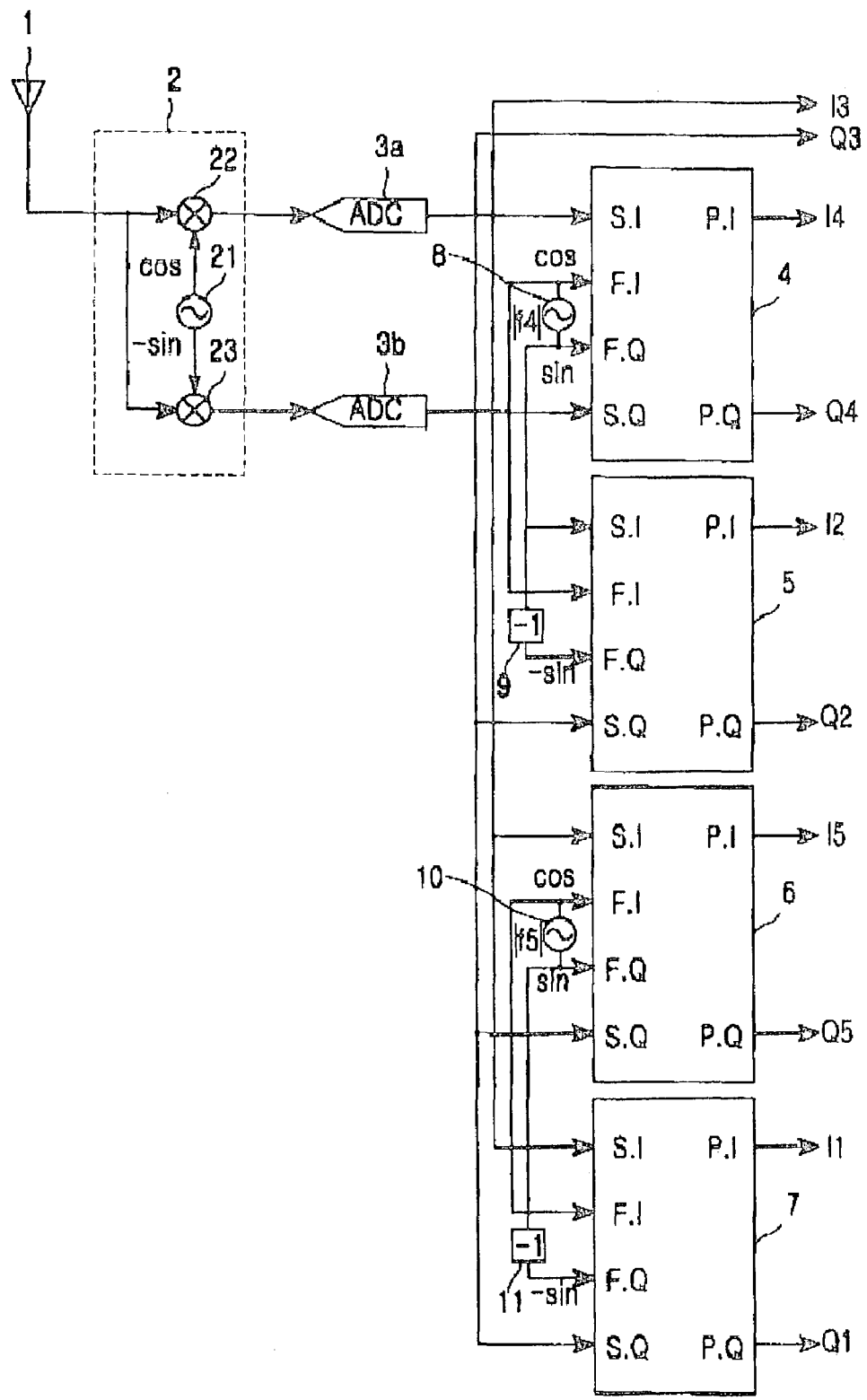
FIG. 2 is a block diagram of the multichannel receiver in accordance with the first preferred embodiment of the present invention.
Figure 9:
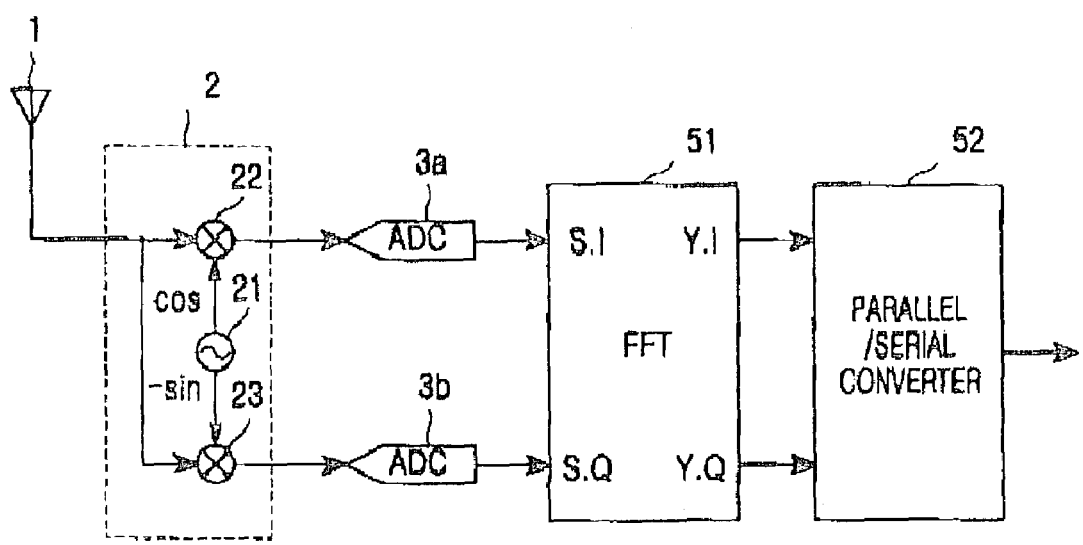
FIG. 9 is a block diagram of a conventional receiver.

FIG. 2 is a block diagram of the multichannel receiver in accordance with the first preferred embodiment of the present invention. Some parts in FIG. 2 are substantially the same as those in FIG. 9, which illustrates a conventional receiver, and thus they are designated by the same reference numerals.

Referring to FIG. 2, a multichannel receiver according to the first preferred embodiment includes a quadrature detector 2. The quadrature detector 2 includes a first multiplier 22 for multiplying a signal received from an antenna 1 by a real number axis signal "cos" of a local signal generated from a quadrature carrier oscillator 21, and a second multiplier 23 for multiplying the signal received from the antenna 1 by an imaginary number axis signal "−sin" having a phase which is 90 degrees ahead of that of the real number axis signal "cos". Then, as illustrated in FIG. 1b, the quadrature detector 2 selects a carrier f3' from among five signals f1', f2', f3', f4' and f5', converts the selected carrier f3' serving as a center signal of the above five signals f1' to f5' into a DC component of zero frequency, and converts the center signal into a complex baseband signal. Simultaneously, the quadrature detector 2 converts the remaining four signals f1', f2', f4', and f5', i.e., the signals other than the carrier f3', into complex IF signals of carriers f1, f2, f4, and f5, which are symmetrical to the DC components of zero frequency. ADCs 3a and 3b perform A/D conversion on the complex IF signals generated from the quadrature detector 2, such that the complex IF signals are converted into complex IF digital signals.

A plurality of signal waveforms illustrated in FIGS. 1a~1b are adapted as an example for the convenience of description and better understanding of the present invention. As illustrated in FIGS. 1a~1b, if the input signal is applied to the quadrature detector 2, then the quadrature detector 2 outputs the signal waveforms illustrated in FIG. 1b. The signal waveforms of FIGS. 1a~1b have the following characteristics. Under the condition that the carrier f3' is converted into a baseband signal, a carrier f1 should be symmetrical to a carrier f5 on the basis of a DC component of zero frequency, a carrier f2 should be symmetrical to a carrier f4 on the basis of the DC component of zero frequency. In other words, local signals (e.g., f1 and f5 or f2 and f4) must have a complex conjugate frequency relation to each other. However, it should be noted that individual local signals are not always arranged at regular intervals or adjacent to each other even though the local signals f1' to f5' or f1 to f5 are arranged at regular intervals and brought into contact with one another as illustrated in FIGS. 1a~1b.

Individual complex IF digital signals of the carriers f1, f2, f4, and f5, which have a symmetrical relation therebetween on the basis of the DC component of zero frequency, are simultaneously applied to complex mixers 4, 5, 6, and 7 related to individual carrier frequencies, such that the complex mixers 4 to 7 perform frequency conversion on their input signals. In the complex mixer 4, which is a complex mixer for the carrier f4, a local signal input terminal F.I receives a real number axis signal "cos" of a local signal generated from a quadrature carrier oscillator 8 for adapting an absolute frequency value of the carrier f4 as an oscillation frequency, and a local signal input terminal F.Q receives an imaginary number axis signal "sin" having a phase which is 90 degrees behind the real number axis signal "cos". The complex mixer 4 performs frequency conversion with the carrier f4 of a negative(−) frequency, converts the carrier f4 into a DC component of zero frequency, and converts the resultant signal into complex baseband signals I4 and Q4.

In the complex mixer 5, which is a complex mixer for the carrier f2, a local signal input terminal F.I receives a real number axis signal "cos" of a local signal generated from a quadrature carrier oscillator 8 for adapting an absolute frequency value of the carrier f4 as an oscillation frequency, and a local signal input terminal F.Q receives an inverse signal "−sin" of an imaginary number axis signal "sin" of the local signal generated from a quadrature carrier oscillator 8. In this case, the signal "−sin" is created by an inverter 9 for inverting the imaginary number axis signal "sin". The complex mixer 5 performs frequency conversion with the carrier f2 of a positive(+) frequency, converts the carrier f2 into a DC component of zero frequency, and converts the resultant signal into complex baseband signals I2 and Q2.

In the complex mixer 6, which is a complex mixer for the carrier f5, a local signal input terminal F.I receives a real number axis signal "cos" of a local signal generated from a quadrature carrier oscillator 10 for adapting an absolute frequency value of the carrier f5 as an oscillation frequency, and a local signal input terminal F.Q receives an imaginary number axis signal "sin" having a phase which is 90 degrees behind the real number axis signal "cos". The complex mixer 6 performs frequency conversion with the carrier f5 of a negative(−) frequency, converts the carrier f5 into a DC component of zero frequency, and converts the resultant signal into complex baseband signals I5 and Q5.

In the complex mixer 7, which is a complex mixer for the carrier f1, a local signal input terminal F.I receives a real number axis signal "cos" of a local signal generated from a quadrature carrier oscillator 10 for adapting an absolute frequency value of the carrier f5 as an oscillation frequency, and a local signal input terminal F.Q receives an inverse signal "−sin" of an imaginary number axis signal "sin" of the local signal generated from a quadrature carrier oscillator 10. In this case, the signal "−sin" is created by an inverter 11 for inverting the imaginary number axis signal "sin". The complex mixer 7 performs frequency conversion with the carrier f1 of a positive(+) frequency, converts the carrier f1 into a DC component of zero frequency, and converts the resultant signal into complex baseband signals I1 and Q1.

The aforementioned complex mixers 4 to 7 for use in a multichannel receiver according to the present invention will hereinafter be described with reference to the annexed drawings.

Figure 3:
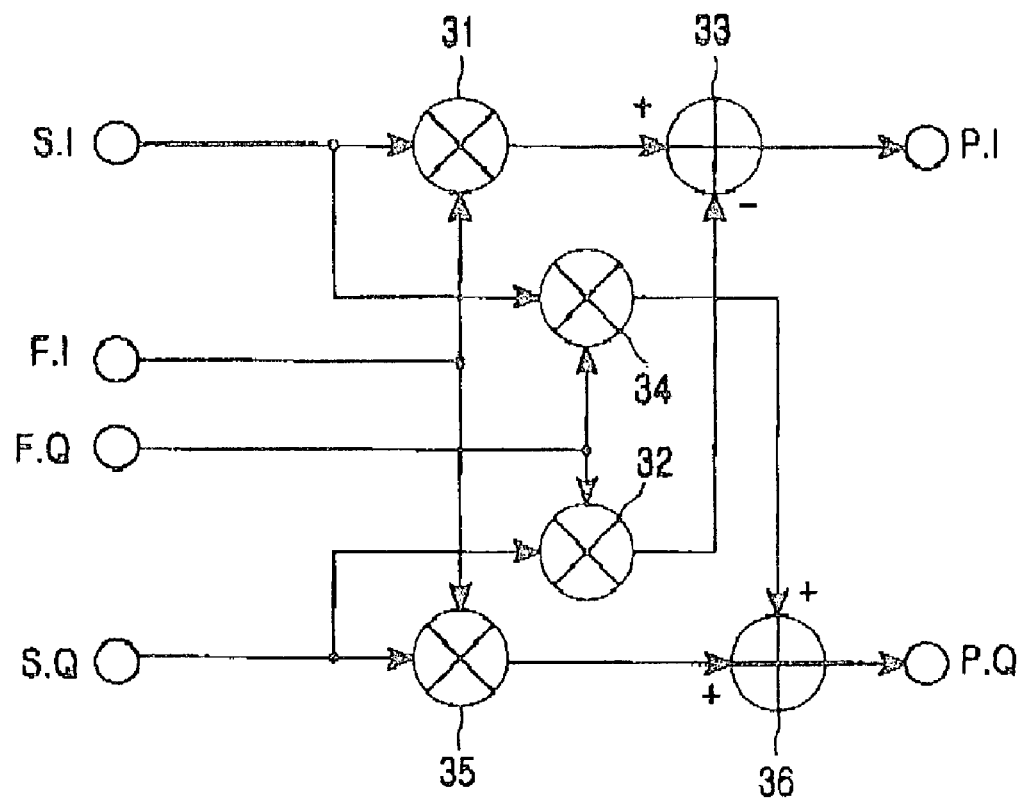
FIG. 3 is a detailed block diagram of a complex mixer contained in the multichannel receiver illustrated in FIG. 2 in accordance with the first preferred embodiment of the present invention.

FIG. 3 is a detailed block diagram of the complex mixer 4, 5, 6, or 7. Referring to FIG. 3, the complex mixer includes a multiplier 31 for multiplying a real number axis signal S.I by a real number axis signal F.I of a local signal generated from a quadrature carrier oscillator, a multiplier 32 for multiplying an imaginary number axis signal S.Q by an imaginary number axis signal F.Q of the local signal generated from the quadrature carrier oscillator, and a subtracter 33 for subtracting an output signal of the multiplier 32 from an output signal of a multiplier 31, and thus generating a real number axis signal P.I. In addition, the complex mixer further includes a multiplier 34 for multiplying the real number axis signal S.I by the imaginary number axis signal F.Q of a local signal generated from a quadrature carrier oscillator, a multiplier 35 for multiplying an imaginary number axis signal S.Q by a real number axis signal F.I of the local signal generated from the quadrature carrier oscillator, and an adder 36 for adding an output signal of the multiplier 35 to an output signal of the multiplier 34, and thus generating an imaginary number axis signal P.Q.

As described above, a multichannel receiver according to the first preferred embodiment enables the quadrature detector 2 to convert a carrier of a center signal among five signals having different channels into a DC component of zero frequency, such that a center signal from among the above five signals can be directly extracted from an output signal of one set of the ADCs 3a~3b as a baseband signal being a digital signal. The multichannel receiver enables the set of ADCs 3a~3b to convert a complex IF signal symmetrical to the DC component of zero frequency into digital signals, controls the digital signals to be associated with carrier frequencies of individual signals, and at the same time the remaining four signals other than the complex IF signal can be converted into baseband signals by complex mixers 4~5 and complex mixers 6~7. In this case, the complex mixers 4—5 and the complex mixers 6~7 contain local signals having a complex conjugate frequency relation to each other. As a result, the first preferred embodiment implements a small-sized improved receiver for effectively reducing a number of calculations and power consumption.

2. Second Preferred Embodiment

Figure 4:
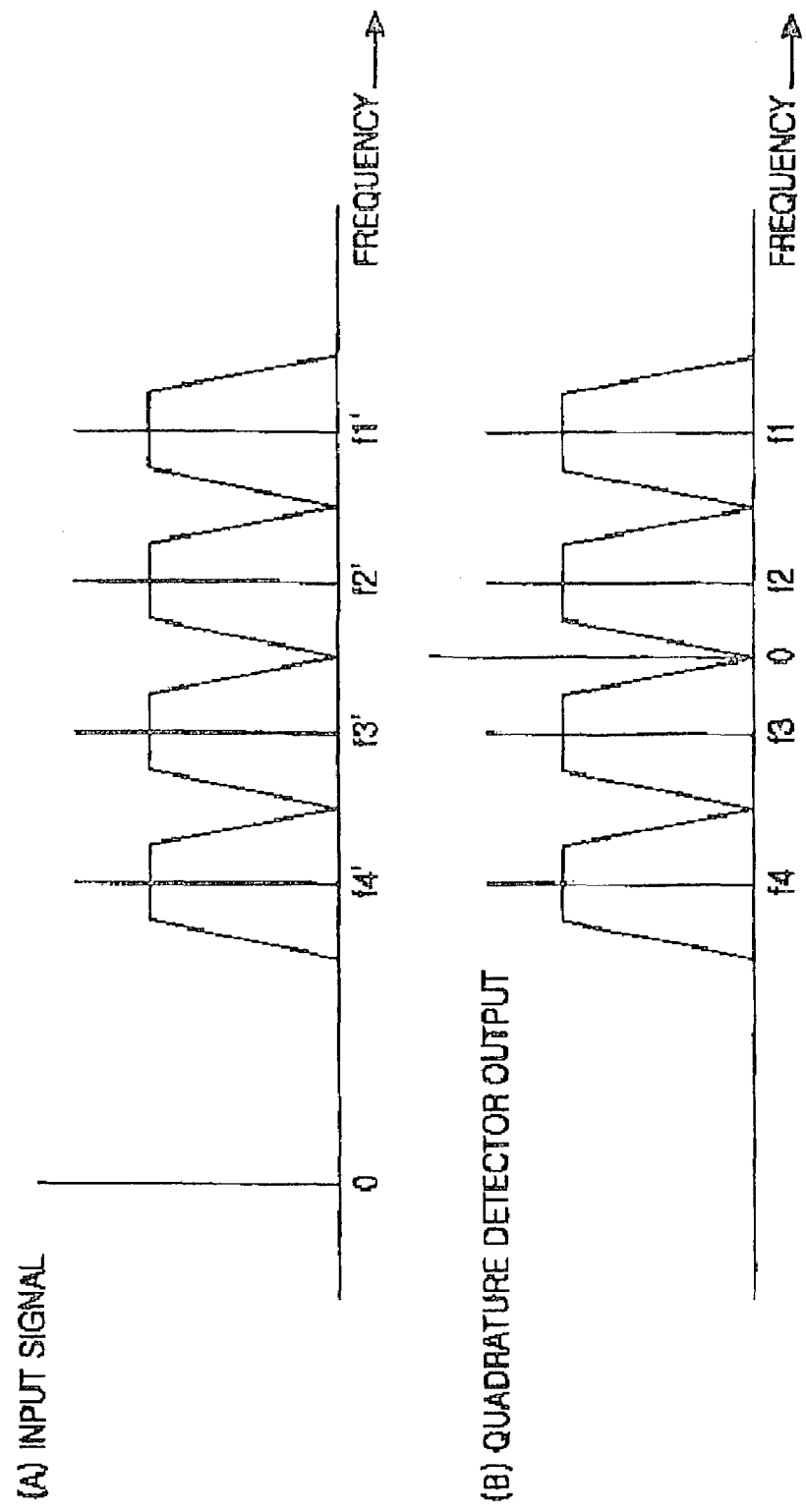
FIG. 4 is an exemplary view illustrating input signals of a multichannel receiver in accordance with a second preferred embodiment of the present invention.

A second preferred embodiment is illustrated with a multichannel for simultaneously receiving four signals f1', f2', f3', and f4', in FIG. 4a.

Figure 5:
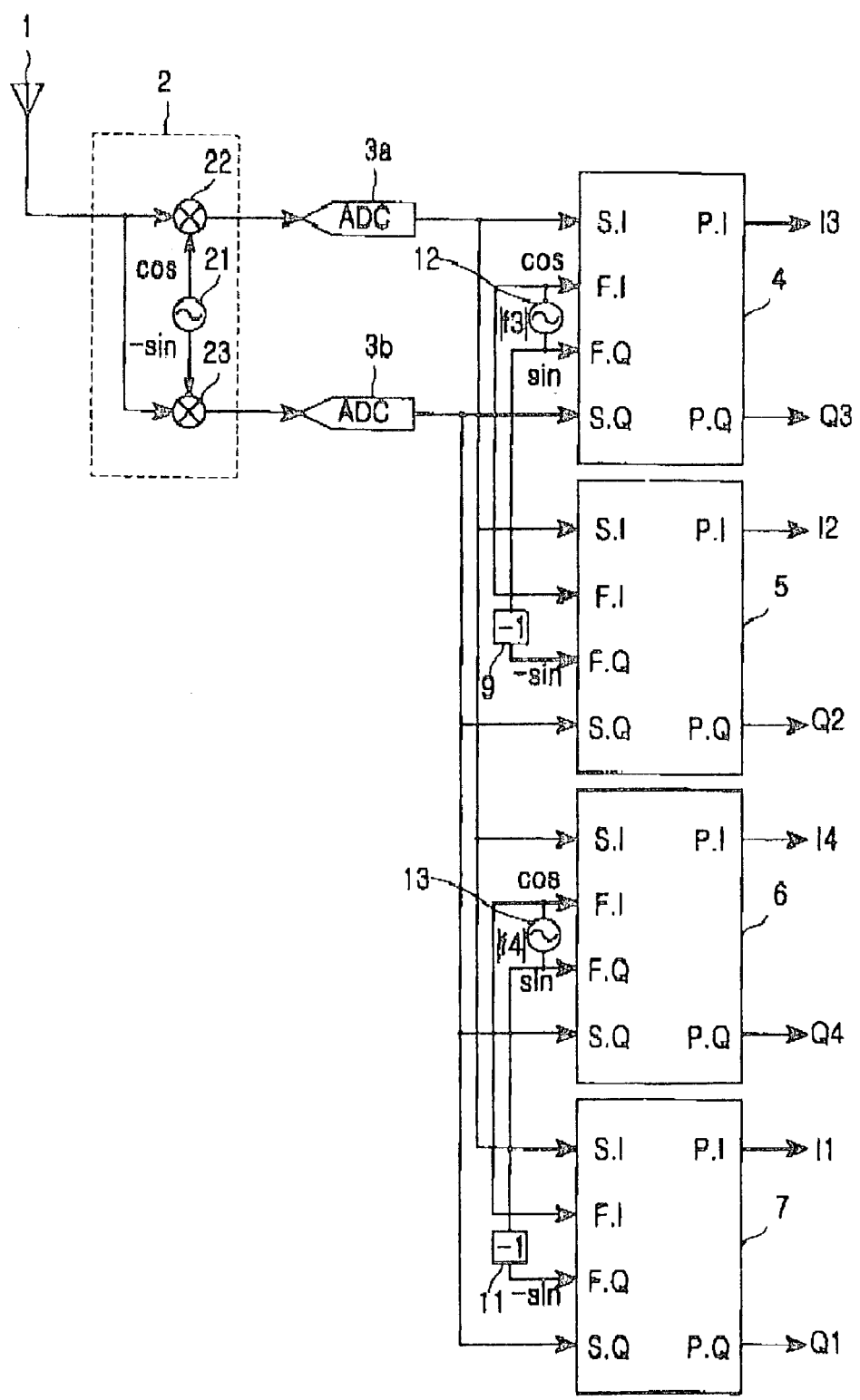
FIG. 5 is a block diagram of the multichannel receiver in accordance with the second preferred embodiment of the present invention.

FIG. 5 is a block diagram of the multichannel receiver in accordance with the second preferred embodiment of the present invention. Some parts in FIG. 5 are substantially the same as those in FIG. 9, which illustrates a conventional receiver, and thus they are designated by the same reference numerals. In addition, some parts in FIG. 5 are substantially the same as those in FIG. 2, which illustrates the multichannel receiver of the first preferred embodiment, and thus, they too are designated by the same reference numerals.

Referring to FIG. 5, a multichannel receiver according to the second preferred embodiment includes a quadrature detector 2. The quadrature detector 2 includes a first multiplier 22 for multiplying a signal received from an antenna 1 by a real number axis signal "cos" of a local signal generated from a quadrature carrier oscillator 21, and a second multiplier 23 for multiplying the signal received from the antenna 1 by an imaginary number axis signal "−sin" having a phase which is 90 degrees ahead of that of the real number axis signal "cos". Then, as illustrated in FIG. 4b, the quadrature detector 2 converts a center frequency from among carrier frequencies of four signals f1', f2', f3', and f4' into a DC component of zero frequency, converts the center signal into a complex baseband signal, and at the same time converts the above four signals into complex IF signals of carriers f1, f2, f3, and f4, which are symmetrical to the DC components of zero frequency. ADCs 3a and 3b perform A/D conversion on the complex IF signals generated from the quadrature detector 2, such that the complex IF signals are converted into complex IF digital signals.

A plurality of signal waveforms illustrated in FIGS. 4a~4b are used as an example for the convenience of description and better understanding of the present invention. As illustrated in FIGS. 4a~4b, if the input signal is applied to the quadrature detector 2, then the quadrature detector 2 outputs the signal waveforms illustrated in FIG. 4b. The signal waveforms of FIGS. 4a~4b have the following characteristics. As illustrated in FIG. 4b, a carrier f1 should be symmetrical to a carrier f4 on the basis of a DC component of zero frequency, a carrier f2 should be symmetrical to a carrier f3 on the basis of the DC component of zero frequency. In other words, carrier components (e.g., f1 and f4 or f2 and f3) must have a complex conjugate frequency relation to each other. However, it should be noted that individual carrier components or signals are not always arranged at regular intervals or adjacent to each other even though the carrier signals f1 to f4 are arranged at regular intervals and brought into contact with one another as illustrated in FIG. 4b.

Individual complex IF digital signals of the carriers f1, f2, f3, and f4 having a symmetrical relation therebetween on the basis of the DC component of zero frequency are simultaneously applied to complex mixers 4, 5, 6, and 7 related to individual carrier frequencies, such that the complex mixers 4 to 7 perform frequency conversion on their input signals. In the complex mixer 4, which is a complex mixer for the carrier f3, a local signal input terminal F.I receives a real number axis signal "cos" of a local signal generated from a quadrature carrier oscillator 12 for adapting an absolute frequency value of the carrier f3 as an oscillation frequency, and a local signal input terminal F.Q receives an imaginary number axis signal "sin" having a phase which is 90 degrees behind the real number axis signal "cos". The complex mixer 4 performs frequency conversion with the carrier f3 of a negative(−) frequency, converts the carrier f3 into a DC component of zero frequency, and converts the resultant signal into complex baseband signals I3 and Q3.

In the complex mixer 5, which is a complex mixer for the carrier f2, a local signal input terminal F.I receives a real number axis signal "cos" of a local signal generated from a quadrature carrier oscillator 12 for adapting an absolute frequency value of the carrier f3 as an oscillation frequency, and a local signal input terminal F.Q receives an inverse signal "−sin" of an imaginary number axis signal "sin" of the local signal generated from a quadrature carrier oscillator 12. In this case, the signal "−sin" is created by an inverter 9 for inverting the imaginary number axis signal "sin". The complex mixer 5 performs frequency conversion with the carrier f2 of a positive(+) frequency, converts the carrier f2 into a DC component of zero frequency, and converts the resultant signal into complex baseband signals I2 and Q2.

In the complex mixer 6, which is a complex mixer for the carrier f4, a local signal input terminal F.I receives a real number axis signal "cos" of a local signal generated from a quadrature carrier oscillator 13 for adapting an absolute frequency value of the carrier f4 as an oscillation frequency, and a local signal input terminal F.Q receives an imaginary number axis signal "sin" having a phase which is 90 degrees behind the real number axis signal "cos". The complex mixer 6 performs frequency conversion with the carrier f4 of a negative(−) frequency, converts the carrier f4 into a DC component of zero frequency, and converts the resultant signal into complex baseband signals I4 and Q4.

In the complex mixer 7, which is a complex mixer for the carrier f1, a local signal input terminal F.I receives a real number axis signal "cos" of a local signal generated from a quadrature carrier oscillator 13 for adapting an absolute frequency value of the carrier f4 as an oscillation frequency, and a local signal input terminal F.Q receives an inverse signal "−sin" of an imaginary number axis signal "sin" of the local signal generated from a quadrature carrier oscillator 13. In this case, the signal "−sin" is created by an inverter 11 for inverting the imaginary number axis signal "sin". The complex mixer 7 performs frequency conversion with the carrier f1 of a positive(+) frequency, converts the carrier f1 into a DC component of zero frequency, and converts the resultant signal into complex baseband signals I1 and Q1.

The aforementioned complex mixers 4 to 7 for use in a multichannel receiver according to the second preferred embodiment are the same as those of FIG. 3, which illustrates the multichannel receiver according to the first preferred embodiment.

As described above, a multichannel receiver according to the second preferred embodiment enables the quadrature detector 2 to convert a center frequency of a carrier frequency of each of four signals having different channels into a DC component of zero frequency, thereby creating four complex IF signals having different channels symmetrical to the DC component of zero frequency. The multichannel receiver controls the set of ADCs 3a~3b to convert four complex IF signals symmetrical to digital signals, controls the digital signals to be associated with carrier frequencies of individual signals, and at the same time, the four signals can be simultaneously converted into baseband signals by complex mixers 4~5 and complex mixers 6~7. In this case, the complex mixers 4~5 and the complex mixers 6~7 contain local signals having a complex conjugate frequency relation to each other. Consequently, the second preferred embodiment implements a small-sized improved receiver for effectively reducing the number of calculations and the amount of power consumption.

3. Third Preferred Embodiment

A third preferred embodiment of the present invention is illustrated with a multichannel receiver for simultaneously receiving four signals f1', f2', f3', and f4' as illustrated in FIG. 4a, and uses a quadrature detector based on a digital signal processing in place of the quadrature detector 2 based on an analog signal processing as described in the first and second preferred embodiments.

Figure 6:
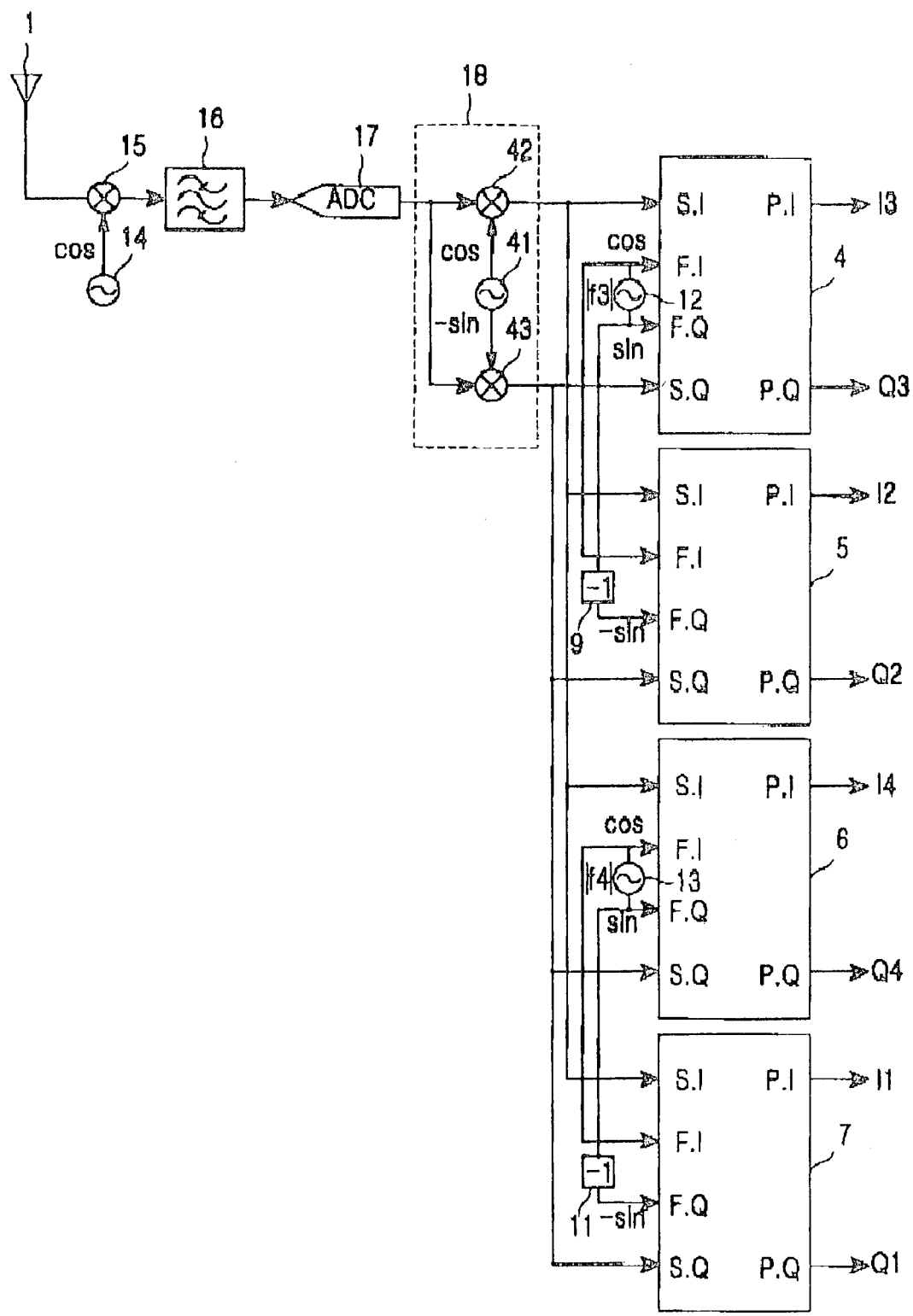
FIG. 6 is a block diagram of a multichannel receiver in accordance with a third preferred embodiment of the present invention.

FIG. 6 is a block diagram of the multichannel receiver in accordance with the third preferred embodiment of the present invention. Some parts in FIG. 6 are substantially the same as those in FIG. 9, which illustrates the conventional receiver, and thus, they are designated by the same reference numerals. In addition, some parts in FIG. 6 are substantially the same as those in FIGS. 2 and 5, which illustrate the multichannel receivers of the first and second preferred embodiments, and thus, they too are designated by the same reference numerals.

Referring to FIG. 6, a multichannel receiver according to the third preferred embodiment includes a mixer 15, a band-pass filter (BPF) 16, an ADC 17, and a digital quadrature detector 18. The mixer 15 multiplies a signal received from an antenna 1 by a real number axis signal "cos" generated from a carrier oscillator 14 to create an IF signal. The BPF 16 receives the IF signal from the mixer 15, and extracts a desired bandwidth signal from the received IF signal. The ADC 17 converts the received signal extracted by the BPF 16 into digital signals. The digital quadrature detector 18 includes a multiplier 42 for multiplying a signal received from the ADC by a real number axis signal "cos" of a local signal generated from a quadrature carrier oscillator 41, and a second multiplier 43 for multiplying a received signal by an imaginary number axis signal "−sin" having a phase which is 90 degrees ahead of that of real number axis signal "cos". Then, as illustrated in FIG. 4b, the digital quadrature detector 18 converts a center frequency from among carrier frequencies of four signals f1', f2', f3', and f4' into a DC component of zero frequency, and converts the four signals f1' to f4' into complex IF signals of carriers f1, f2, f3, and f4 symmetrical to the DC component of zero frequency.

The plurality of signal waveforms illustrated in FIGS. 4a~4b are used as an example for the convenience of description and better understanding of the present invention. As illustrated in FIGS. 4a~4b, if the input signal is applied to the digital quadrature detector 18, then the digital quadrature detector 18 outputs the signal waveforms illustrated in FIG. 4b. The signal waveforms of FIGS. 4a~4b have the following characteristics. A carrier f1 should be symmetrical to a carrier f4 on the basis of a DC component of zero frequency, a carrier f2 should be symmetrical to a carrier f3 on the basis of the DC component of zero frequency. In other words, local signals (e.g., f1 and f4 or f2 and f3) must have a complex conjugate frequency relation to each other. However, it should be noted that individual local signals are not always arranged at regular intervals or adjacent to each other even though the local signals f1 to f4 are arranged at regular intervals and brought into contact with one another as illustrated in FIG. 4a.

Individual complex IF digital signals of the carriers f1, f2, f3, and f4 having a symmetrical relation therebetween on the basis of the DC component of zero frequency are simultaneously applied to complex mixers 4, 5, 6, and 7 related to individual carrier frequencies, such that the complex mixers 4 to 7 perform frequency conversion on their input signals.

In the complex mixer 4, which is a complex mixer for the carrier f3, a local signal input terminal F.I receives a real number axis signal "cos" of a local signal generated from a quadrature carrier oscillator 12 for adapting an absolute frequency value of the carrier f3 as an oscillation frequency, and a local signal input terminal F.Q receives an imaginary number axis signal "sin" having a phase which is 90 degrees behind the real number axis signal "cos". The complex mixer 4 performs frequency conversion with the carrier f3 of a negative(−) frequency, converts the carrier f3 into a DC component of zero frequency, and converts the resultant signal into complex baseband signals I3 and Q3.

In the complex mixer 5, which is a complex mixer for the carrier f2, a local signal input terminal F.I receives a real number axis signal "cos" of a local signal generated from a quadrature carrier oscillator 12 for adapting an absolute frequency value of the carrier f3 as an oscillation frequency, and a local signal input terminal F.Q receives an inverse signal "−sin" of an imaginary number axis signal "sin" of the local signal generated from a quadrature carrier oscillator 12. In this case, the signal "−sin" is created by an inverter 9 for inverting the imaginary number axis signal "sin". The complex mixer 5 performs frequency conversion with the carrier f2 of a positive(+) frequency, converts the carrier f2 into a DC component of zero frequency, and converts the resultant signal into complex baseband signals I2 and Q2.

In the complex mixer 6, which is a complex mixer for the carrier f4, a local signal input terminal F.I receives a real number axis signal "cos" of a local signal generated from a quadrature carrier oscillator 13 for adapting an absolute frequency value of the carrier f4 as an oscillation frequency, and a local signal input terminal F.Q receives an imaginary number axis signal "sin" having a phase which is 90 degrees behind the real number axis signal "cos". The complex mixer 6 performs frequency conversion with the carrier f4 of a negative(−) frequency, converts the carrier f4 into a DC component of zero frequency, and converts the resultant signal into complex baseband signals I4 and Q4.

In the complex mixer 7, which is a complex mixer for the carrier f1, a local signal input terminal F.I receives a real number axis signal "cos" of a local signal generated from a quadrature carrier oscillator 13 for adapting an absolute frequency value of the carrier f4 as an oscillation frequency, and a local signal input terminal F.Q receives an inverse signal "−sin" of an imaginary number axis signal "sin" of the local signal generated from a quadrature carrier oscillator 13. In this case, the signal "−sin" is created by an inverter 11 for inverting the imaginary number axis signal "sin". The complex mixer 7 performs frequency conversion with the carrier f1 of a positive(+) frequency, converts the carrier f1 into a DC component of zero frequency, and converts the resultant signal into complex baseband signals I1 and Q1.

The aforementioned complex mixers 4 to 7 for use in a multichannel receiver according to the third preferred embodiment are the same as those of FIG. 3, which illustrates the multichannel receiver according to the first and second preferred embodiments.

As described above, a multichannel receiver according to the third preferred embodiment enables the mixer 15 to convert a received signal into an IF signal, and enables the ADC 17 to convert the IF signal into a digital signal. The multichannel receiver converts a center frequency of a carrier frequency; of each of four signals having different channels into a DC component of zero frequency, thereby creating four complex IF signals having different channels symmetrical to the DC component of zero frequency. The multichannel receiver controls the digital signals to be associated with carrier frequencies of individual signals, and at the same time, the four signals can be simultaneously converted into baseband signals by complex mixers 4~5 and complex mixers 6~7. In this case, the complex mixers 4~5 and the complex mixers 6~7 contain local signals having a complex conjugate frequency relation to each other.

As a result, the third preferred embodiment implements a small-sized improved receiver for effectively reducing the number of calculations and the amount of power consumption, converts a plurality of signals into digital signals, and converts the digital signals into complex IF digital signals by means of the digital quadrature detector 18. Therefore, when converting received signals into complex signals, a plurality of signals received from a frequency converter are not interfered by their image signals. For instance, in the case whether there is a high signal level difference between a first complex IF frequency signal of a positive(+) frequency and a second complex IF frequency signal of a negative(−) frequency symmetrical to the positive(+) frequency of the first complex IF frequency signal, the multichannel receiver need not compensate the characteristics of the frequency converter, and prevents a low level input signal from being affected by a high level input signal, such that the low level input signal can be stably and effectively applied to the multichannel receiver. Consequently, the multichannel receiver has superior signal reception characteristics in all kinds of signals.

4. Fourth Preferred Embodiment

According to a fourth preferred embodiment, the complex mixers 4 to 7 used in the first to third preferred embodiments are shared with one another, resulting in a simplified circuit configuration.

Figure 7:
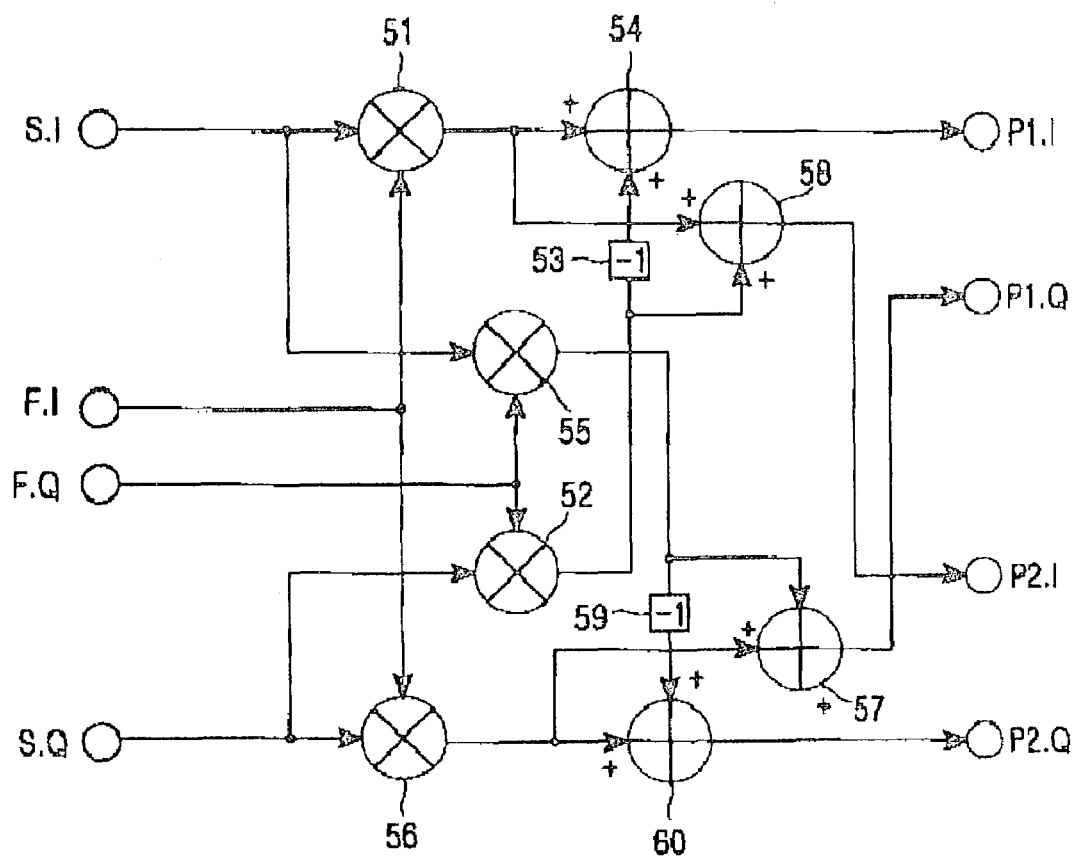
FIG. 7 is a detailed block diagram illustrating a prescribed case where a multiplier for a positive(+) frequency and a multiplier for a negative(−) frequency are shared in the multichannel receiver.

FIG. 7 is a detailed block diagram illustrating a combined complex mixer in which a multiplier for a positive(+) frequency and another multiplier for a negative(−) frequency are shared in the multichannel receiver, as illustrated in a set of complex mixers 4 and 5 or a set of complex mixers 6 and 7. The combined complex mixer includes a multiplier 51 for multiplying a real number axis signal S.I by a real number axis signal F.I of a local signal generated from a quadrature carrier oscillator, a multiplier 52 for multiplying an imaginary number axis signal S.Q by an imaginary number axis signal F.Q of the local signal generated from the quadrature carrier oscillator, and an adder 54 for adding an inverse signal of an output signal of the multiplier 52 to an output signal of the multiplier 51, and thus generating a real number axis signal P1.I contained in two real number axis signals. The inverse signal of the output signal of the multiplier 52 is created by an inverter 53, such that a frequency area of the output signal of the multiplier 52 is inverted through the inverter 53.

The combined complex mixer also includes a multiplier 55 for multiplying a real number axis signal S.I by an imaginary number axis signal F.Q from a quadrature carrier oscillator, a multiplier 56 for multiplying an imaginary number axis signal S.Q by a real number axis signal F.I of the local signal generated from the quadrature carrier oscillator, and an adder 57 for adding an output signal of the multiplier 56 to an output signal of the multiplier 55, and thus generating an imaginary number axis signal P1.Q contained in two imaginary number axis signals. In addition, the complex mixer further includes adders 58 and 60. The adder 58 adds the output signal of the multiplier 52 to the output signal of the multiplier 51, and thus generates a real number axis signal P2.1 contained in two real number axis signals. The output signal's mark of the multiplier 55 is inverted to the opposite mark at an inverter 59. The adder 60 adds the output signal of the inverter 59 to the output signal of the multiplier 56, and thus generates an imaginary number axis signal P2.Q contained in two imaginary number axis signals.

Provided that the aforementioned combined complex mixer is adapted to the multichannel receiver described in the first preferred embodiment, the combined complex mixer will operate as follows.

Figure 8:
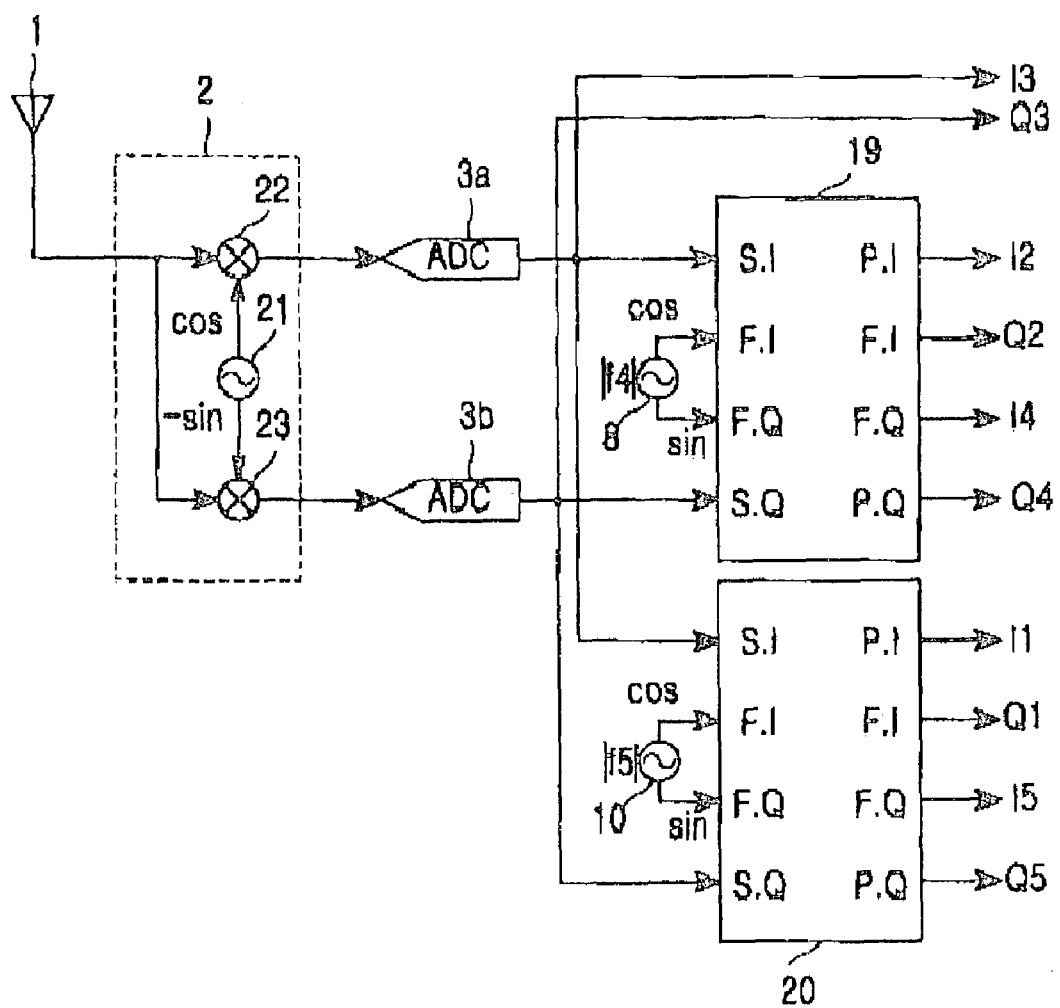
FIG. 8 is a block diagram of a multichannel receiver in accordance with a fourth preferred embodiment of the present invention.

FIG. 8 is a block diagram of the multichannel receiver described in the first preferred embodiment for use with the combined complex mixer illustrated in FIG. 7. Some parts in FIG. 8 are substantially the same as those in FIG. 9, which illustrates the conventional receiver, and thus, they are designated by the same reference numerals. In addition, some parts in FIG. 8 are substantially the same as those in FIGS. 2, 5, and 6, which illustrate the multichannel receivers of the first to third preferred embodiments, and thus, they too are designated by the same reference numerals.

Referring to FIG. 8, a multichannel receiver according to the first preferred embodiment includes a quadrature detector 2. The quadrature detector 2 includes a first multiplier 22 for multiplying a signal received from an antenna 1 by a real number axis signal "cos" of a local signal generated from a quadrature carrier oscillator 21, and a second multiplier 23 for multiplying the signal received from the antenna 1 by an imaginary number axis signal "−sin" having a phase which is 90 degrees ahead of that of the real number axis signal "cos". Then, as illustrated in FIG. 1b, the quadrature detector 2 selects a carrier f3' from among five signals f1', f2', f3', f4', and f5', converts the selected carrier f3' serving as a center signal of the above five signals f1' to f5' into a DC component of zero frequency, and converts the center signal into a complex baseband signal. Simultaneously, the quadrature detector 2 converts the remaining four signals f1', f2', f4', and f5', other than the carrier f3', into complex IF signals of carriers f1, f2, f4, and f5, which are symmetrical to the DC components of zero frequency. ADCs 3a and 3b perform A/D conversion on the complex IF signals generated from the quadrature detector 2, such that the complex IF signals are converted into complex IF digital signals.

In the same manner as the first preferred embodiment, a plurality of signal waveforms illustrated in FIGS. 1a~1b are used as an example for the convenience of description and better understanding of the present invention. As illustrated in FIGS. 1a~1b, if the input signal is applied to the quadrature detector 2, then the quadrature detector 2 outputs the signal waveforms illustrated in FIG. 1b. The signal waveforms of FIGS. 1a~1b have the following characteristics. Under the condition that the carrier f3' is converted into a baseband signal, a carrier f1 should be symmetrical to a carrier f5 on the basis of a DC component of zero frequency, a carrier f2 should be symmetrical to a carrier f4 on the basis of the DC component of zero frequency. In other words, local signals (e.g., f1 and f5 or f2 and f4) must have a complex conjugate frequency relation to each other. However, it should be noted that individual local signals are not always arranged at regular intervals or adjacent to each other even though the local signals f1' to f5' or f1 to f5 are arranged at regular intervals and brought into contact with one another as illustrated in FIGS. 1a~1b.

Individual complex IF digital signals of the carriers f1, f2, f4, and f5, which have a symmetrical relation therebetween on the basis of the DC component of zero frequency, are simultaneously applied to combined complex mixers 19 and 20, such that the combined complex mixers 19 and 20 perform frequency conversion on their input signals. In the combined complex mixer 19, which is a combined complex mixer for the carriers f4 and f1, a local signal input terminal F.I receives a real number axis signal "cos" of a local signal generated from a quadrature carrier oscillator 8 for adapting an absolute frequency value of the carrier f4 as an oscillation frequency, and a local signal input terminal F.Q receives an imaginary number axis signal "sin" having a phase which is 90 degrees behind the real number axis signal "cos". The combined complex mixer 19 performs frequency conversion with the carrier f4 of a negative(−) frequency, converts the carrier f4 into a DC component of zero frequency, and converts the resultant signal into complex baseband signals I4 and Q4. Simultaneously, the complex mixer 19 performs frequency conversion with the carrier f2 of a positive(+) frequency, converts the carrier f2 into a DC component of zero frequency, and converts the resultant signal into complex baseband signals I2 and Q2.

In the combined complex mixer 20, which is a complex mixer for the carrier f5, a local signal input terminal F.I receives a real number axis signal "cos" of a local signal generated from a quadrature carrier oscillator 10 for adapting an absolute frequency value of the carrier f5 as an oscillation frequency, and a local signal input terminal F.Q receives an imaginary number axis signal "sin" having a phase which is 90 degrees behind the real number axis signal "cos". The combined complex mixer 20 performs frequency conversion with the carrier f5 of a negative(−) frequency, converts the carrier f5 into a DC component of zero frequency, and converts the resultant signal into complex baseband signals I5 and Q5. The combined complex mixer 20 performs frequency conversion with the carrier F1 of a positive(+) frequency, converts the carrier f1 into a DC component of zero frequency, and thus converts the resultant signal into complex baseband signals I1 and Q1.

The aforementioned preferred embodiment illustrated in FIG. 8 illustrates a prescribed example in which a plurality of multipliers with local signals having a complex conjugate relation to each other are shared with one another, as illustrated in a set of complex mixers 4 and 6 or a set of complex mixers 6 and 7 used in the multichannel receiver described in the first preferred embodiment. Although the preferred embodiment illustrated in FIG. 8 uses the combined complex mixers 19 and 20 to the multichannel receiver of the first preferred embodiment, the combined complex mixers 19 and 20 can be also applicable to a prescribed example in which complex mixers 4 and 5 or complex mixers 6 and 7 described in the second and third preferred embodiment are shared with each other.

As described above, the multichannel receiver according to the above preferred embodiment enables the quadrature detector 2 to convert a carrier of a center signal among five signals having different channels into a DC component of zero frequency, such that a center signal from among the above five signals can be directly extracted from an output signal of a set of the ADCs 3a~3b as a baseband signal indicated as a digital value. The multichannel receiver enables the set of ADCs 3a~3b to convert a complex conjugate frequency signal symmetrical to the DC component of zero frequency into digital signals. In the same way as the complex mixers 4 and 5 or 6 and 7 used in the first to third preferred embodiments, the combined complex mixers 19 and 20 with local signals having a complex conjugate relation to each other can convert the remaining four signals into baseband signals at the same time.

However, the aforementioned preferred embodiment implements a small-sized improved receiver for effectively reducing the number of calculations and the amount of power consumption.

In the meantime, although the first to fourth preferred embodiments each describe a multichannel receiver for effectively receiving a multichannel signal having no restriction in the symbol timing and channel interval of modulated signals, the multichannel receiver may also receive a multicarrier signal having restrictions in the symbol timing and frequency interval of modulated signals.

As described above, a multichannel receiver according to the present invention can directly extract a center signal among at least three signals from an output signal of a set of ADCs as a baseband signal being a digital signal. The multichannel receiver enables the set of ADCs to convert a complex IF signal symmetrical to a DC component of zero frequency into digital signals, and allows positive(+) frequency converters and negative(−) frequency converters to convert the resultant signal into baseband signals at the same time. In this case, the number of positive(+) frequency converters and the number of negative(−) frequency converters are respectively identical with the number of signals including local signals having a complex conjugate relation to each other.

Therefore, a center signal among an odd number of signals can be effectively extracted as a baseband signal, the remaining more than two signals symmetrical to the DC component of zero frequency can also be effectively extracted by the positive(+) and negative(−) frequency converters. As a result, the multichannel receiver implements a small-sized improved receiver for effectively reducing the number of calculations and the amount of power consumption.

Further, a multichannel receiver according to the present invention enables the set of ADCs to convert a complex IF signal symmetrical to a DC component of zero frequency into digital signals, and allows positive(+) frequency converters and negative(−) frequency converters to convert the resultant signal into baseband signals at the same time. In this case, the number of positive(+) frequency converters and the number of negative(−) frequency converters are respectively identical with the number of signals including local signals having a complex conjugate relation to each other.

Therefore, the remaining more than two signals symmetrical to the DC component of zero frequency can also be effectively extracted by the positive(+) and negative(−) frequency converters. As a result, the multichannel receiver implements a small-sized improved receiver for effectively reducing the number of calculations and the amount of power consumption.

In addition, a multichannel receiver according to the present invention enables a primary frequency converter to convert an even number of signals having different channels into IF signals, and controls ADCs to convert the IF signals into digital signals, such that a complex output digital frequency converter can convert at least two even signals into complex IF digital signals symmetrical to a DC component of zero frequency. In addition, the multichannel allows positive(+) frequency converters and negative(−) frequency converters to convert the complex IF digital signals into baseband signals at the same time. In this case, the number of positive(+) frequency converters and the number of negative(−) frequency converters are respectively identical with the number of signals including local signals having a complex conjugate relation to each other.

Therefore, because the multichannel receiver converts a plurality of signals into digital signals, and enables the complex output digital frequency converter to convert the digital signals into complex IF signals, there is no noise caused by image interference of a frequency converter in a signal conversion process from digital signals to complex signals. For example, although there is a high signal level difference between a first complex IF frequency signal of a positive(+) frequency and a second complex IF frequency signal of a negative(−) frequency symmetrical to the positive(+) frequency of the first complex IF frequency signal, the multichannel receiver can obtain the superior signal reception characteristics without compensating the characteristics of the frequency converter.

The multichannel receiver selects either complex local signals of a positive(+) frequency converter or complex local signals of a negative(−) frequency converter. The multichannel receiver creates the remaining complex local signals except the selected complex local signals by means of the selected complex local signals, and thus need not use a new local signal generator, resulting in a smaller-sized receiver driven with a lower power consumption.

Further, a multichannel receiver according to the present invention shares a multiplier of a positive(+) frequency converter with a multiplier of a negative(−) frequency converter whose a complex local signal is a complex conjugate of that of the positive(+) frequency converter, such that complex IF signals of positive(+) and negative(−) frequencies symmetrical to a DC component of zero frequency can be converted into baseband signals at the same time, resulting in a smaller-sized receiver driven with a lower power consumption.

Accordingly, a multichannel receiver according to the present invention converts an odd number of signals of more than three signals or an even number of signals of more than two signals into complex IF signals composed of positive(+) and negative(−) frequency signals symmetrical to a DC component of zero frequency, such that it can receive even a multi-carrier signal having restrictions in the symbol timing and frequency interval of signals in the same manner as in a multichannel signal. As a result, the multichannel receiver can receive such a conventional multi-carrier signal using a small-sized receiver with a small amount of calculations and a low power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multichannel receiver for simultaneously receiving an odd number of a plurality of signals having different channels, comprising:

a complex output frequency converter for convening a carrier of a center signal of the odd number of the plurality of signals line a DC (Direct Current) component of zero frequency, converting the center signal into a complex baseband signal, and converting signals other than the center signal into a complex IF (Intermediate Frequency) signal symmetrical to the DC component of zero frequency;

a plurality of ADCs (Analog-to-Digital Converters) for sampling a real number axis signal and an imaginary number axis signal of the complex output signals of the complex output frequency converter to create digital signals;

at least one positive(+) frequency converter, corresponding to the individual channels, for convening at least one positive(+) channel complex signal generated from the ADCs into baseband signals; and at least one negative(−) frequency converter, corresponding to the individual channels, for converting at least one negative(−) channel complex signal generated from the ADCs into baseband signals, wherein a complex local signal of the positive(+) frequency converter corresponding to a complex IF signal symmetrical to the DC component of zero frequency is a complex conjugate of a complex local signal of the negative(−) frequency converter.

2. The multichannel receiver as set forth in claim 1, wherein one of the complex local signal of the positive(+) frequency converter and the complex local signal of the negative(−) frequency converter is prepared, and an unprepared complex local signal is created by a complex conjugate signal of the prepared complex local signal.

3. The multichannel receiver as set forth in claim 2, wherein the positive(+) frequency converter having a first complex local signal and the negative(−) frequency converter having a second complex local signal serving as a complex conjugate of the first complex local signal are included in a combined frequency converter including multipliers of the positive(+) and negative(−) frequency converters.

4. The multichannel receiver as set forth in claim 3, wherein the odd number of the plurality of signals having different channels are multi-carrier signals.

5. The multichannel receiver as set forth in claim 2, wherein the odd number of the plurality of signals having different channels are multi-carrier signals.

6. The multichannel receiver as set forth in claim 1, wherein the positive(+) frequency converter having a first complex local signal and the negative(−) frequency converter having a second complex local signal serving as a complex conjugate of the first complex local signal are included in a combined frequency converter including multipliers of the positive(+) and negative(−) frequency converters.

7. The multichannel receiver as set forth in claim 6, wherein the odd number of the plurality of signals having different channels are multi-carrier signals.

8. The multichannel receiver as set forth in claim 1, wherein the odd number of the plurality of signals having different channels are multi-carrier signals.

9. A multichannel receiver for simultaneously receiving an even number of a plurality of signals having different channels, comprising:

a complex output frequency converter for converting a center frequency of a carrier frequency of the even number of the plurality of signals into a DC (Direct Current) component of zero frequency, and converting the even number of the plurality of signals into a complex LF (Intermediate Frequency) signal symmetrical to the DC component of zero frequency;

a plurality of ADCs (Analog-to-Digital Converters) for sampling a real number axis signal and an imaginary number axis signal of the complex output signals of the complex output frequency converter to create digital signals, at least one positive(+) frequency converter, corresponding to individual channels, for convening at least one positive(+) channel complex signal generated from the ADCs into complex baseband signals; and at least one negative(−) frequency converter, corresponding to the individual channels, for converting at least one negative(−) channel complex signal generated from the ADCs into complex baseband signals, wherein a complex local signal of the positive(+) frequency converter corresponding to a complex IF signal symmetrical to the DC component of zero frequency is a complex conjugate of a complex local signal of the negative(−) frequency converter.

10. The multichannel receiver as set forth in claim 9, wherein one of the complex local signal of the positive(+) frequency converter and the complex local signal of the negative(−) frequency converter is prepared, and an unprepared complex local signal is created by a complex conjugate signal of the prepared complex local signal.

11. The multichannel receiver as set forth in claim 10, wherein the positive(+) frequency converter having a first complex local signal and the negative(−) frequency converter having a second complex local signal serving as a complex conjugate of the first complex local signal are included in a combined frequency converter including multipliers of the positive(+) and negative(−) frequency converters.

12. The multichannel receiver as set forth in claim 11, wherein the even number of the plurality of signals having different channels are multi-carrier signals.

13. The multichannel receiver as set forth in claim 10, wherein the even number of the plurality of signals having different channels are multi-carrier signals.

14. The multichannel receiver as set forth in claim 9, wherein the positive(+) frequency converter having a first complex local signal and the negative(−) frequency converter having a second complex local signal serving as a complex conjugate of the first complex local signal are included in a combined frequency converter including multipliers of the positive(+) and negative(−) frequency converters.

15. The multichannel receiver as set forth in claim 14, wherein the even number of the plurality of signals having different channels are multi-carrier signals.

16. The multichannel receiver as set forth in claim 9, wherein the even number of the plurality of signals having different channels are multi-carrier signals.

17. A multichannel receiver for simultaneously receiving an even number of a plurality of signals having different channels, comprising:

a primary frequency converter for converting the even number of the plurality of signals into IF (Intermediate Frequency) signals;

an ADC (Analog-to-Digital Converter) for sampling an output signal of the primary frequency converter to generate a digital signal;

a complex output digital frequency converter for converting a center frequency of a carrier frequency of the even number of the plurality of signals into a DC (Direct Current) component of zero frequency, and converting the even number of the plurality of signals into a complex IF digital signal symmetrical to the DC component of zero frequency;

at least one positive(+) frequency converter, corresponding to individual channels, for converting at least one positive(+) channel complex signal generated from the complex output digital frequency converter into complex baseband signals; and at least one negative(−) frequency converter, corresponding to the individual channels, for converting at least one negative(−) channel complex signal generated from the complex output digital frequency converter into complex baseband signals, wherein a complex local signal of the positive(−) frequency converter corresponding to a complex IF signal symmetrical to the DC component of zero frequency is a complex conjugate of a complex local signal of the negative(−) frequency converter.

18. The multichannel receiver as set forth in claim 17, wherein one of the complex local signal of the positive(+) frequency converter and the complex local signal of the negative(−) frequency converter is prepared, and an unprepared complex local signal is created by a complex conjugate signal of the prepared complex local signal.

19. The multichannel receiver as set forth in claim 18, wherein the positive(+) frequency converter having a first complex local signal and the negative(−) frequency converter having a second complex local signal serving as a complex conjugate of the first complex local signal are included in a combined frequency converter including multipliers of the positive(+) and negative(−) frequency converters.

20. The multichannel receiver as set forth in claim 19, wherein the even number of the plurality of signals having different channels are multi-carrier signals.

21. The multichannel receiver as set forth in claim 18, wherein the even number of the plurality of signals having different channels are multi-carrier signals.

22. The multichannel receiver as set forth in claim 17, wherein the positive(+) frequency converter having a first complex local signal and the negative(−) frequency converter having a second complex local signal serving as a complex conjugate of the first complex local signal are included in a combined frequency converter including multipliers of the positive(+) and negative(−) frequency converters.

23. The multichannel receiver as set forth in claim 22, wherein the even number of the plurality of signals having different channels are multi-carrier signals.

24. The multichannel receiver as set forth in claim 17, wherein the even number of the plurality of signals having different channels are multi-carrier signals.

* * * * *